United States Patent
Yi et al.

(10) Patent No.: US 10,904,830 B2
(45) Date of Patent: Jan. 26, 2021

(54) METHOD AND APPARATUS FOR SUPPORTING ENERGY SAVING MECHANISMS FOR NR IN WIRELESS COMMUNICATION SYSTEM

(71) Applicant: LG ELECTRONICS INC., Seoul (KR)

(72) Inventors: Yunjung Yi, Seoul (KR); Kijun Kim, Seoul (KR); Daesung Hwang, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/064,666

(22) PCT Filed: Sep. 29, 2017

(86) PCT No.: PCT/KR2017/010948
§ 371 (c)(1),
(2) Date: Jun. 21, 2018

(87) PCT Pub. No.: WO2018/066923
PCT Pub. Date: Apr. 12, 2018

(65) Prior Publication Data
US 2019/0223097 A1      Jul. 18, 2019

Related U.S. Application Data

(60) Provisional application No. 62/405,244, filed on Oct. 7, 2016, provisional application No. 62/442,392, filed on Jan. 4, 2017.

(51) Int. Cl.
*H04W 52/02* (2009.01)
*H04W 72/04* (2009.01)
(Continued)

(52) U.S. Cl.
CPC ... *H04W 52/0216* (2013.01); *H04W 72/0453* (2013.01); *H04L 41/0806* (2013.01);
(Continued)

(58) Field of Classification Search
CPC ......... H04W 52/0216; H04W 72/0453; H04W 52/0229; H04W 24/08; Y02D 70/144;
(Continued)

(56) References Cited

U.S. PATENT DOCUMENTS 8,705,375 B2 *  4/2014  Jaakkola ........... H04W 52/0216
                                                    370/242
9,066,197 B2 *  6/2015  Kiukkonen ....... H04W 52/0229
(Continued)

FOREIGN PATENT DOCUMENTS

EP          3337246      6/2018
JP          2015502089   1/2015
(Continued)

OTHER PUBLICATIONS

Jaeyeol Ha et al., Feasibility Analysis and Implementation of the IEEE 802.15.4 Multi-hop Beacon Enabled Network, Apr. 2005, 8 pages.
(Continued)

*Primary Examiner* — Brian T O'Connor
(74) *Attorney, Agent, or Firm* — Fish & Richardson P.C.

(57) ABSTRACT

As one of energy saving mechanisms for a new radio access technology (NR), a power saving state may be defined according to the present invention. More specifically, a user equipment (UE) enters an active state, monitors a first radio frequency (RF) bandwidth for the active state, enters the power saving state, and monitors a second RF bandwidth, which is restricted to M MHz within the first RF bandwidth, for the power saving state.

14 Claims, 10 Drawing Sheets

(51) Int. Cl.
*H04L 12/24* (2006.01)
*H04L 12/26* (2006.01)
*H04W 24/08* (2009.01)

(52) U.S. Cl.
CPC ........ *H04L 41/0816* (2013.01); *H04L 43/045* (2013.01); *H04L 43/103* (2013.01); *H04W 24/08* (2013.01); *H04W 52/0229* (2013.01); *Y02D 30/70* (2020.08)

(58) Field of Classification Search
CPC . Y02D 70/142; H04L 41/0806; H04L 43/103; H04L 43/045; H04L 41/0816
See application file for complete search history.

(56) References Cited

U.S. PATENT DOCUMENTS

| | | | | |
|---|---|---|---|---|
| 9,167,521 | B2* | 10/2015 | Lin | H04W 52/0229 |
| 9,572,106 | B2* | 2/2017 | Ang | H04L 1/0018 |
| 9,603,151 | B2* | 3/2017 | Rune | H04W 72/048 |
| 9,716,643 | B2* | 7/2017 | Chan | H04L 41/0806 |
| 9,781,724 | B2* | 10/2017 | Wang | H04W 48/06 |
| 9,872,251 | B2* | 1/2018 | Trainin | H04W 74/0808 |
| 10,306,591 | B2* | 5/2019 | Starsinic | H04W 52/0216 |
| 10,321,433 | B2* | 6/2019 | Matsuo | H04W 72/02 |
| 2002/0098819 | A1 | 7/2002 | Phang | |
| 2003/0148800 | A1 | 8/2003 | Lee | |
| 2004/0252662 | A1 | 12/2004 | Cho | |
| 2010/0214942 | A1* | 8/2010 | Du | H04L 43/0876 370/252 |
| 2012/0243638 | A1 | 9/2012 | Maltsev et al. | |
| 2013/0316652 | A1* | 11/2013 | Wang | H04W 48/06 455/41.2 |
| 2014/0206346 | A1* | 7/2014 | Kiukkonen | H04W 52/0229 455/426.1 |
| 2015/0119058 | A1* | 4/2015 | Rune | H04W 72/048 455/452.1 |
| 2016/0105860 | A1 | 4/2016 | Li et al. | |
| 2016/0127991 | A1 | 5/2016 | Ang et al. | |
| 2017/0195954 | A1* | 7/2017 | Ghosh | H04W 52/0216 |
| 2018/0006922 | A1* | 1/2018 | Chan | H04L 41/0806 |
| 2018/0020408 | A1* | 1/2018 | Zhang | H04W 76/28 |
| 2018/0054799 | A1* | 2/2018 | Starsinic | H04W 52/0219 |
| 2018/0092039 | A1* | 3/2018 | Cariou | H04W 52/0235 |
| 2018/0255515 | A1* | 9/2018 | Gupta Hyde | H04W 52/0235 |
| 2019/0045424 | A1* | 2/2019 | Rune | H04W 48/16 |

FOREIGN PATENT DOCUMENTS

| | | |
|---|---|---|
| JP | 2018500791 | 1/2018 |
| KR | 20140002038 | 1/2014 |
| WO | WO2015020377 A1 | 2/2015 |
| WO | WO2016069115 | 5/2016 |

OTHER PUBLICATIONS

Extended European Search Report in European Application No. 17858717.6, dated Jul. 10, 2019, 7 pages.
Huawei, HiSilicon, "Mechanisms of bandwidth adaptation for control and data reception in single-carrier and multi-carrier cases", R1-1611655, 3GPP TSG RAN WG1 Meeting #87, Reno, USA, Nov. 14-18, 2016, 4 pages.
Huawei, HiSilicon, "Support of flexible bandwidth", R1-1608841, 3GPP TSG RAN WG1 Meeting #86bis, Lisbon, Portugal, Oct. 10-14, 2016, 6 pages.
Japanese Office Action in Japanese Appln. No. 2019-518414, dated Jun. 30, 2020, 7 pages (with English translation).
MediaTek Inc., "On Techniques for Enhanced UE Power Efficiency", R1-1609557, 3GPP TSG RAN WG1 Meeting #86bis, Lisbon, Portugal, Oct. 10-14, 2016, 5 pages.
Japanese Notice of Allowance in Japanese Appln. No. 2019-518414, dated Oct. 6, 2020, 5 pages (with English translation).

* cited by examiner

METHOD AND APPARATUS FOR SUPPORTING ENERGY SAVING MECHANISMS FOR NR IN WIRELESS COMMUNICATION SYSTEM

CROSS-REFERENCE TO RELATED APPLICATIONS

This application is a National Stage application under 35 U.S.C. § 371 of International Application No. PCT/KR2017/010948, filed on Sep. 29, 2017, which claims the benefit of U.S. Provisional Application No. 62/405,244, filed on Oct. 7, 2016, and U.S. Provisional Application No. 62/442,392, filed on Jan. 4, 2017. The disclosures of the prior applications are incorporated by reference in their entirety.

BACKGROUND OF THE INVENTION

Field of the Invention

The present invention relates to wireless communications, and more particularly, to a method and apparatus for supporting energy saving mechanisms for a new radio access technology (NR) in a wireless communication system.

Related Art

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per hit, increased service availability, flexible use of a frequency band, a simple structure, an open interface, and adequate power consumption of a terminal as an upper-level requirement.

As more and more communication devices require more communication capacity, there is a need for improved mobile broadband communication over existing radio access technology. Also, massive machine type communications (MTC), which provides various services by connecting many devices and objects, is one of the major issues to be considered in the next generation communication. In addition, communication system design considering reliability/latency sensitive service/UE is being discussed. The introduction of next generation radio access technology considering enhanced mobile broadband communication, massive MTC, ultra-reliable and low latency communication (URLLC) is discussed. This new technology may be called new radio access technology (new RAT or NR) for convenience.

In NR, analog beamforming may be introduced. In case of millimeter wave (mmW), the wavelength is shortened so that a plurality of antennas can be installed in the same area. For example, in the 30 GHz band, a total of 100 antenna elements can be installed in a 2-dimension array of 0.5 lambda (wavelength) intervals on a panel of 5 by 5 cm with a wavelength of 1 cm. Therefore, in mmW, multiple antenna elements can be used to increase the beamforming gain to increase the coverage or increase the throughput.

In this case, if a transceiver unit (TXRU) is provided so that transmission power and phase can be adjusted for each antenna element, independent beamforming is possible for each frequency resource. However, installing a TXRU on all 100 antenna elements has a problem in terms of cost effectiveness. Therefore, a method of mapping a plurality of antenna elements to one TXRU and adjusting the direction of a beam using an analog phase shifter is considered. This analog beamforming method has a disadvantage that it cannot perform frequency selective beaming because it can make only one beam direction in all bands.

A hybrid beamforming with B TXRUs, which is an intermediate form of digital beamforming and analog beamforming, and fewer than Q antenna elements, can be considered. In this case, although there is a difference depending on the connection method of the B TXRU and Q antenna elements, the direction of the beam that can be simultaneously transmitted is limited to B or less.

For operating NR efficiently, various schemes have been discussed.

SUMMARY OF THE INVENTION

The present invention provides a method and apparatus for supporting energy saving mechanisms for a new radio access technology (NR) in a wireless communication system. This present invention discusses mechanisms to support energy-efficient control/data channel processing mechanisms.

In an aspect, a method for operating in a power saving state by a user equipment (UE) in a wireless communication system is provided. The method includes entering an active state, monitoring a first radio frequency (RF) bandwidth for the active state, entering the power saving state, and monitoring a second RF bandwidth, which is restricted to M MHz within the first RF bandwidth, for the power saving state.

In another aspect, a user equipment (UE) in a wireless communication system is provided. The includes a memory, a transceiver, and a processor, coupled to the memory and the transceiver, that enters an active state, controls the transceiver to monitor a first radio frequency (RF) bandwidth for the active state, enters a power saving state, and controls the transceiver to monitor a second RF bandwidth, which is restricted to M MHz within the first RF bandwidth, for the power saving state.

A battery consumption of a user equipment (UE) can be saved in NR.

DESCRIPTION OF EXEMPLARY EMBODIMENTS

Figure 1:
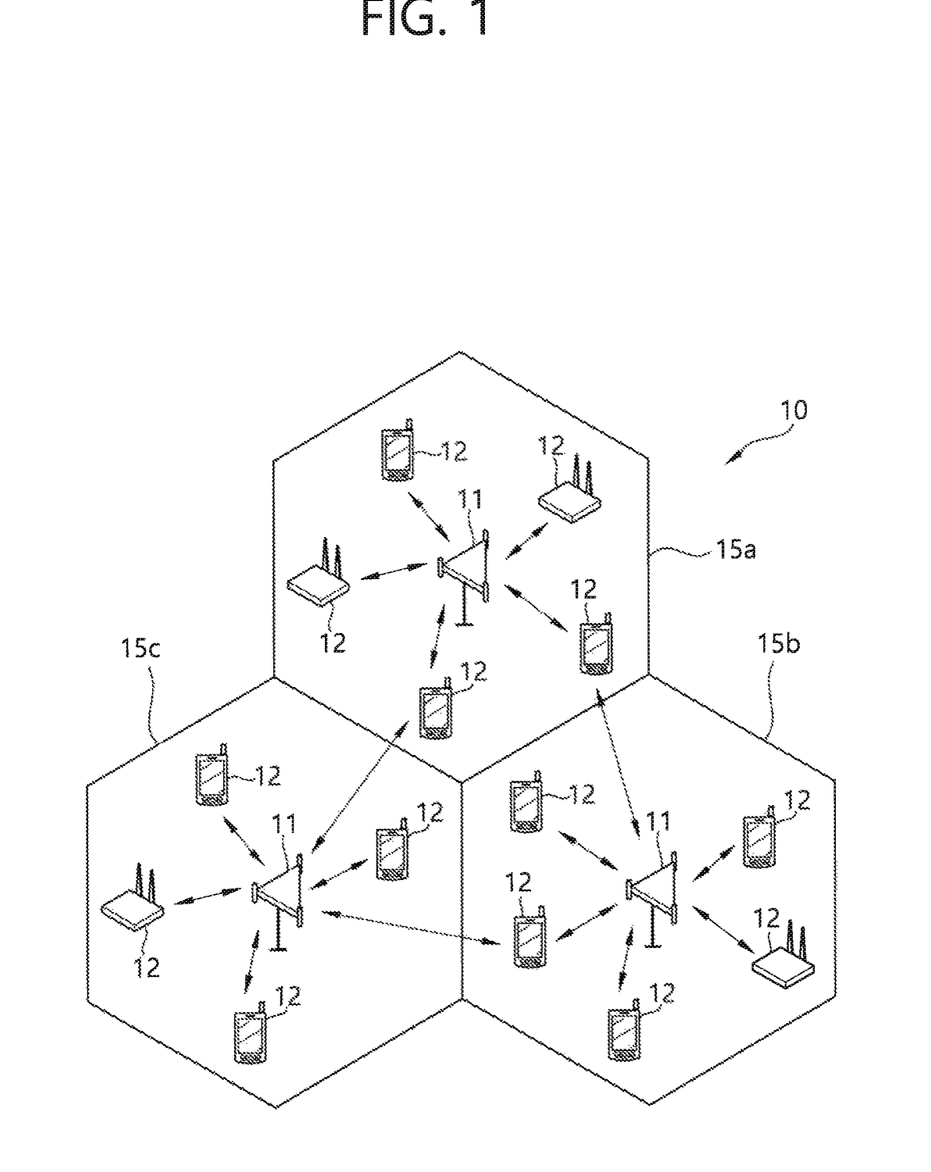
FIG. 1 shows a 3GPP LTE system.

FIG. 1 shows a 3GPP LTE system. The 3rd generation partnership project (3GPP) long-term evolution (LTE) system 10 includes at least one eNodeB (eNB) 11. Respective eNBs 11 provide a communication service to particular geographical areas 15a, 15b, and 15c (which are generally called cells). Each cell may be divided into a plurality of areas (which are called sectors). A user equipment (UE) 12 may be fixed or mobile and may be referred to by other names such as mobile station (MS), mobile terminal (MT), user terminal (UT), subscriber station (SS), wireless device, personal digital assistant (PDA), wireless modem, handheld device. The eNB 11 generally refers to a fixed station that communicates with the UE 12 and may be called by other names such as base station (BS), base transceiver system (BTS), access point (AP), etc.

In general, a UE belongs to one cell, and the cell to which a UE belongs is called a serving cell. An eNB providing a communication service to the serving cell is called a serving eNB. The wireless communication system is a cellular system, so a different cell adjacent to the serving cell exists. The different cell adjacent to the serving cell is called a neighbor cell. An eNB providing a communication service to the neighbor cell is called a neighbor eNB. The serving cell and the neighbor cell are relatively determined based on a UE.

This technique can be used for DL or LTL. In general, DL refers to communication from the eNB 11 to the UE 12, and UL refers to communication from the LTE 12 to the eNB 11. In DL, a transmitter may be part of the eNB 11 and a receiver may be part of the UE 12. In UL, a transmitter may be part of the UE 12 and a receiver may be part of the eNB 11.

The wireless communication system may be any one of a multiple-input multiple-output (MIMO) system, a multiple-input single-output (MISO) system, a single-input single-output (SISO) system, and a single-input multiple-output (SIMO) system. The MIMO system uses a plurality of transmission antennas and a plurality of reception antennas. The MISO system uses a plurality of transmission antennas and a single reception antenna. The SISO system uses a single transmission antenna and a single reception antenna. The SIMO system uses a single transmission antenna and a plurality of reception antennas. Hereinafter, a transmission antenna refers to a physical or logical antenna used for transmitting a signal or a stream, and a reception antenna refers to a physical or logical antenna used for receiving a signal or a stream.

Figure 2:
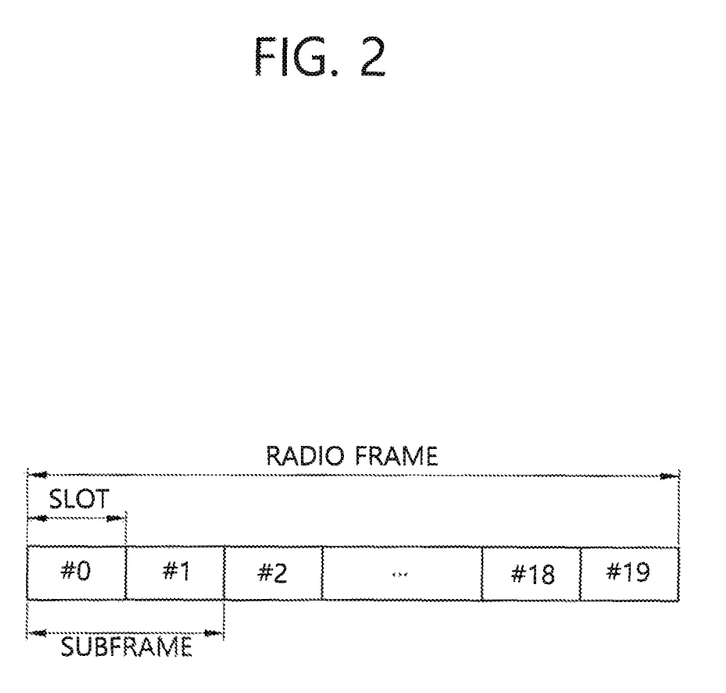
FIG. 2 shows structure of a radio frame of 3GPP LTE.

FIG. 2 shows structure of a radio frame of 3GPP LTE. Referring to FIG. 2, a radio frame includes 10 subframes. A subframe includes two slots in time domain. A time for transmitting one transport block by higher layer to physical layer (generally over one subframe) is defined as a transmission time interval (TTI). For example, one subframe may have a length of 1 ms, and one slot may have a length of 0.5 ms. One slot includes a plurality of orthogonal frequency division multiplexing (OFDM) symbols in time domain. Since the 3GPP LTE uses the OFDMA in the DL, the OFDM symbol is for representing one symbol period. The OFDM symbols may be called by other names depending on a multiple-access scheme. For example, when SC-TWA is in use as a UL multi-access scheme, the OFDM symbols may be called SC-FDMA symbols. A resource block (RB) is a resource allocation unit, and includes a plurality of contiguous subcarriers in one slot. The structure of the radio frame is shown for exemplary purposes only. Thus, the number of subframes included in the radio frame or the number of slots included in the subframe or the number of OFDM symbols included in the slot may be modified in various manners.

Figure 3:
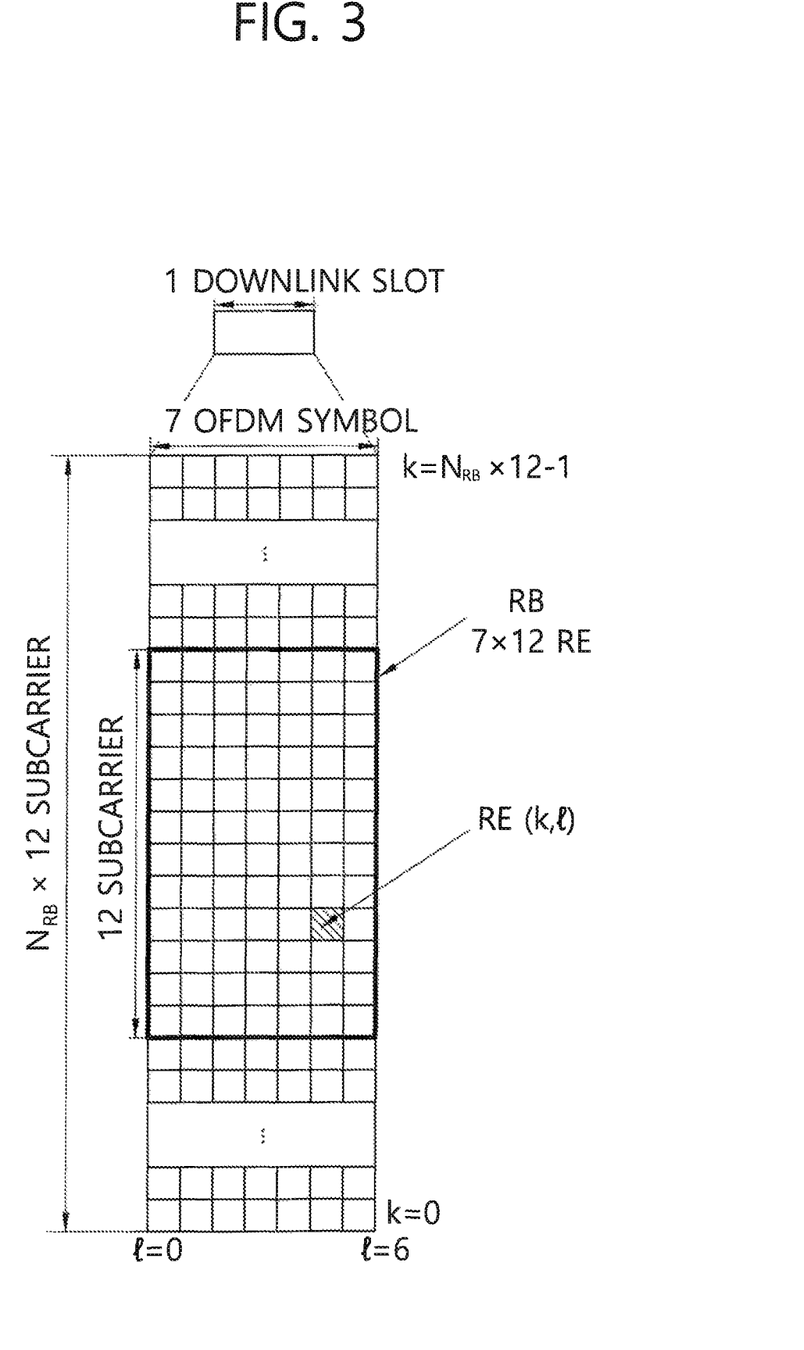
FIG. 3 shows a resource grid for one downlink slot.

The wireless communication system may be divided into a frequency division duplex (FDD) scheme and a time division duplex (TDD) scheme. According to the FDD scheme, UL transmission and DL transmission are made at different frequency bands. According to the TDD scheme, UL transmission and DL transmission are made during different periods of time at the same frequency band. A channel response of the TDD scheme is substantially reciprocal. This means that a DL channel response and a UL channel response are almost the same in a given frequency band. Thus, the TDD-based wireless communication system is advantageous in that the DL channel response can be obtained from the UL channel response. In the TDD scheme, the entire frequency band is tune-divided for UT, and DL transmissions, so a DL transmission by the eNB and a UL transmission by the UE cannot be simultaneously performed in a TDD system in which a UL transmission and a DL transmission are discriminated in units of subframes, the UL transmission and the DL transmission are performed in different subframes. In a TDD system, to allow fast switching between DL and UL, UL and DL transmission may be performed within a same subframe/slot in time division multiplexing (TDM)/frequency division multiplexing (FDM) manner. FIG. 3 shows a resource grid for one downlink slot. Referring to FIG. 3, a DL slot includes a plurality of OFDM symbols in time domain. It is described herein that one DL slot includes 7 OFDM symbols, and one RB includes 12 subcarriers in frequency domain as an example. However, the present invention is not limited thereto. Each element on the resource grid is referred to as a resource element (RE). One RB includes 12×7 or 12×14 resource elements. The number $N_{DL}$ of RBs included in the DL slot depends on a DL transmit bandwidth. The structure of a UL slot may be same as that of the DL slot. The number of OFDM symbols and the number of subcarriers may vary depending on the length of a CP, frequency spacing, etc. For example, in case of a normal cyclic prefix (CP), the number of OFDM symbols is 7 or 14, and in case of an extended CP, the number of OFDM symbols is 6 or 12. One of 128, 256, 512, 1024, 1536, 2048, 4096 and 8192 may be selectively used as the number of subcarriers in one OFDM symbol.

5th generation mobile networks or 5th generation wireless systems, abbreviated 5G, are the proposed next telecommunications standards beyond the current 4G LTE/intentional mobile telecommunications (IMT)-dvanced standards. 5G includes both new radio access technology (new RAT or NR) and LTE evolution. Hereinafter, among 5G, NR will be focused. 5G planning aims at higher capacity than current 4G LTE, allowing a higher density of mobile broadband users, and supporting device-to-device, ultra-reliable, and massive machine communications. 5G research and development also aims at lower latency than 4G equipment and lower battery consumption, for better implementation of the Internet of things.

It is expected that different frame structure may be necessary for NR. Particularly, different frame structure in which UL and DL may be present in every subframe or may change very frequently in the same carrier may be necessary for NR. Different application may require different minimum size of DL or UL portions to support different latency and coverage requirements. For example, massive machine-type communication (mMTC) for high coverage case may require relatively long DL and UL portion so that one transmission can be successfully transmitted. Furthermore, due to different requirement on synchronization and tracking accuracy requirements, different subcarrier spacing and/or different CP length may be considered. In this sense, it is necessary to consider mechanisms to allow different frame structures coexisting in the same carrier and be operated by the same cell/eNB.

In NR, utilizing a subframe in which downlink and uplink are contained may be considered. This scheme may be applied for paired spectrum and unpaired spectrum. The paired spectrum means that one carrier consists of two carriers. For example, in the paired spectrum, the one carrier may include a DL carrier and an UL carrier, which are paired with each other. In the paired spectrum, communication, such as DL, UL, device-to-device communication, and/or relay communication, may be performed by utilizing the paired spectrum. The unpaired spectrum means that one carrier consists of only one carrier, like the current 4G LTE. In the unpaired spectrum, communication, such as DL, UL, device-to-device communication, and/or relay communication, may be performed in the unpaired spectrum.

Further, in NR, the following subframe types may be considered to support the paired spectrum and the unpaired spectrum mentioned above.

(1) Subframes including DL control and DL data
(2) Subframes including DL control, DL data, and UL control
(3) Subframes including DL control and UL data
(4) Subframes including DL control, UL data, and UL control
(5) Subframes including access signals or random access signals or other purposes.
(6) Subframes including both DL/UL and all UL signals.

However, the subframe types listed above are only exemplary, and other subframe types may also be considered.

Figure 4:
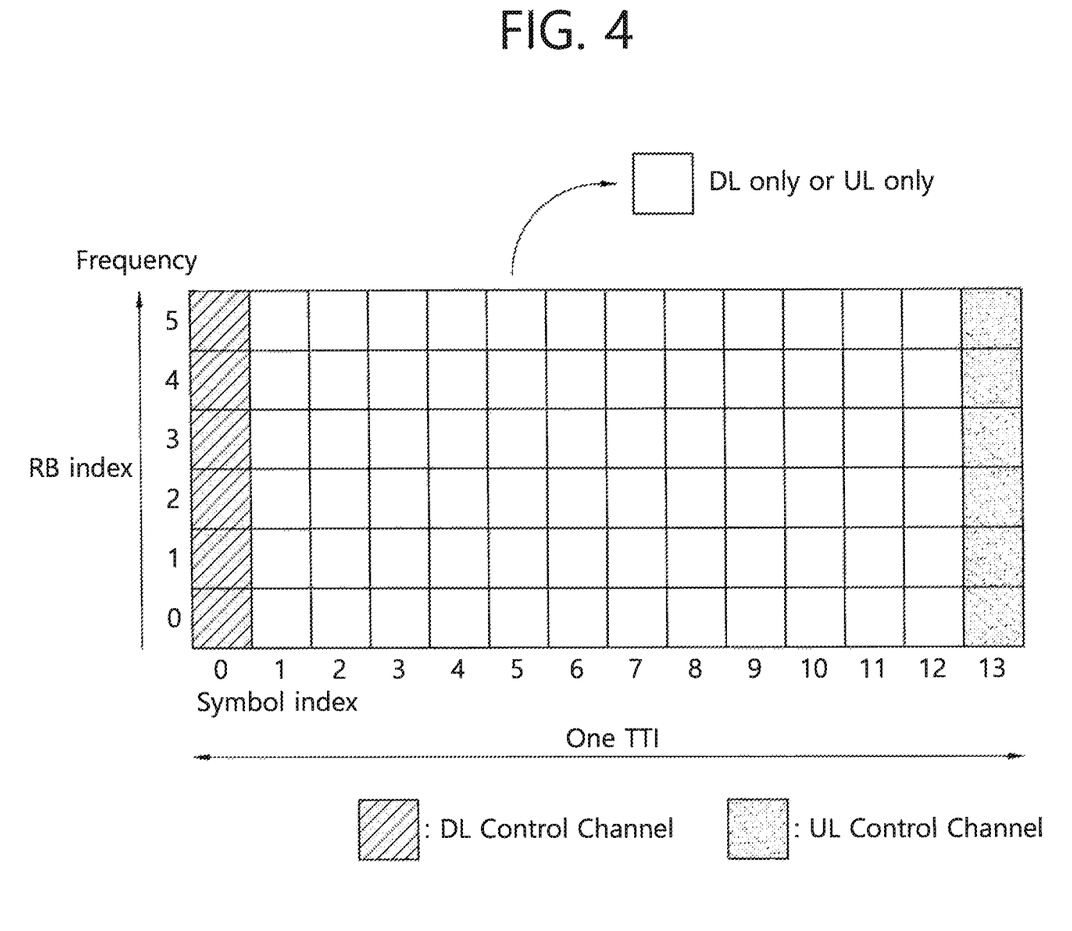
FIG. 4 shows an example of subframe type for NR.

FIG. 4 shows an example of subframe type for NR. The subframe shown in FIG. 4 may be used in TDD system of NR, in order to minimize latency of data transmission. Referring to FIG. 4, the subframe contains 14 symbols in one TTI, like the current subframe. However, the subframe includes DL control channel in the first symbol, and UL control channel in the last symbol. The remaining symbols may be used for DL data transmission or for UL data transmission. According to this subframe structure, DL transmission and UL transmission may sequentially proceed in one subframe. Accordingly, DL data may be transmitted in the subframe, and UL acknowledgement/non-acknowledgement (ACK/NACK) may also be received in the subframe. In this manner, the subframe shown in FIG. 4 may be referred to as self-contained subframe. As a result, it may take less time to retransmit data when a data transmission error occurs, thereby minimizing the latency of final data transmission. In the self-contained subframe structure, a time gap may be required for the transition process from the transmission mode to the reception mode or from the reception mode to the transmission mode. For this purpose, some OFDM symbols at the time of switching from DL to UL in the subframe structure may be set to the guard period (GP).

Different numerologies may be aligned at symbol level or slot/subframe level. In normal CP, symbol level alignment may be achieved by various options. In the description below, for $F_s = F_0 * 2^n$ (n is a positive integer, $F_0 = 15$ kHz), each symbol length (including CP) of $F_0$ equals the sum of the corresponding $2^n$ symbols of $F_s$.

Figure 5:
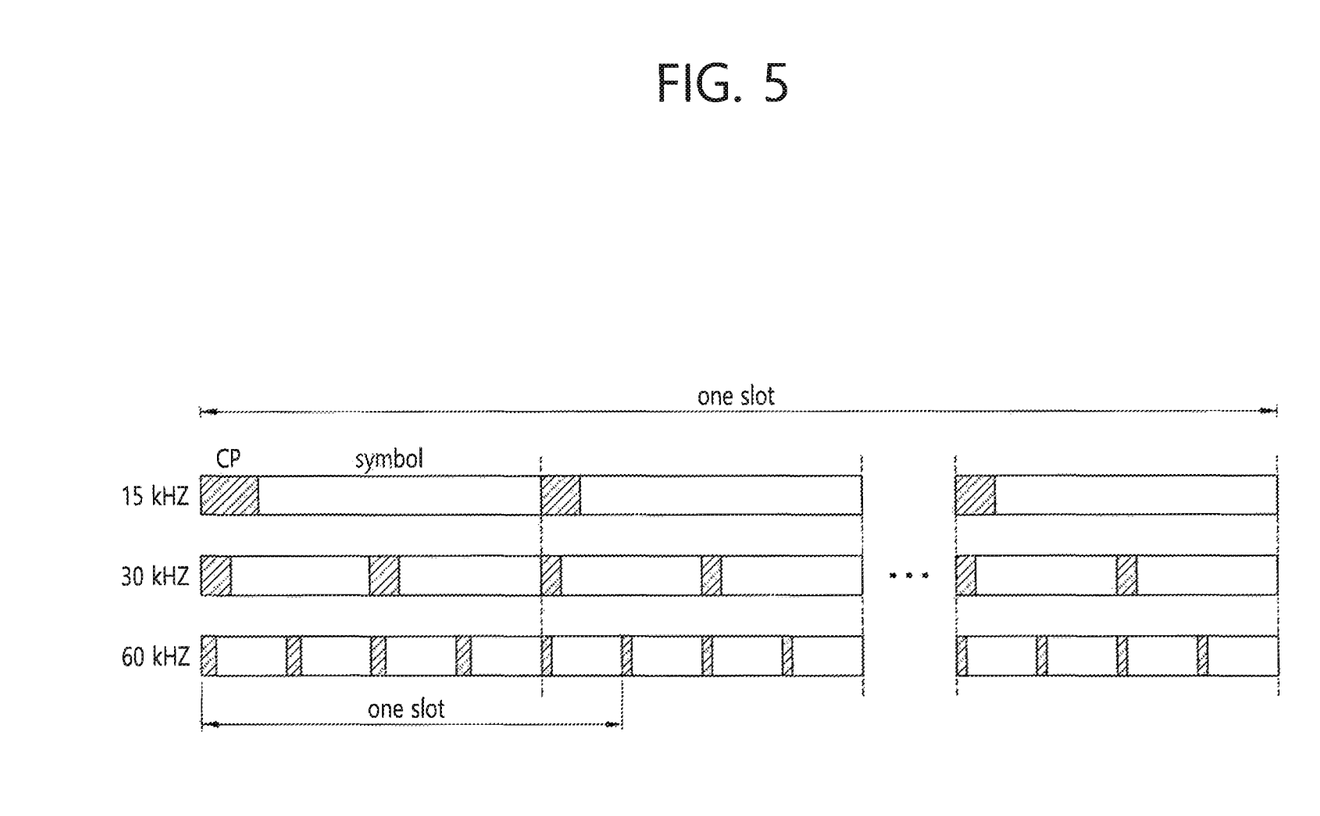
FIG. 5 shows an example of symbol level alignment between different numerologies.

FIG. 5 shows an example of symbol level alignment between different numerologies. Referring to FIG. 5, the first $2^n$ symbols of $F_s$ have equal symbol length.

Figure 6:
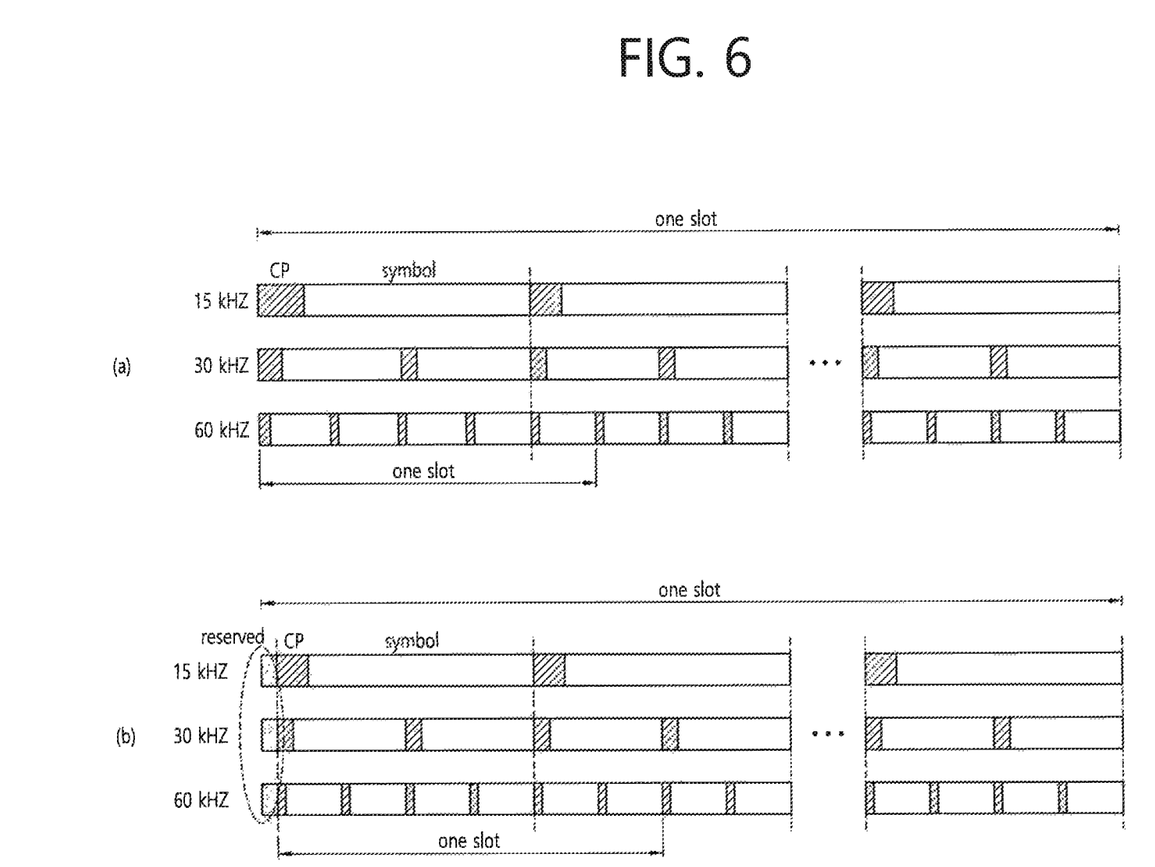
FIG. 6 shows another example of symbol level alignment between different numerologies. R

FIG. 6 shows another example of symbol level alignment between different numerologies. Referring to FIG. 6-(a), except for the first symbol of $F_s$, all symbols of $F_s$ have equal symbol length. The length of first symbol of $F_s$ is sum of length of the second symbol and 0.51 us. Referring to FIG. 6-(b), 0.51 us is reserved, and all symbols have the equal length.

Figure 7:
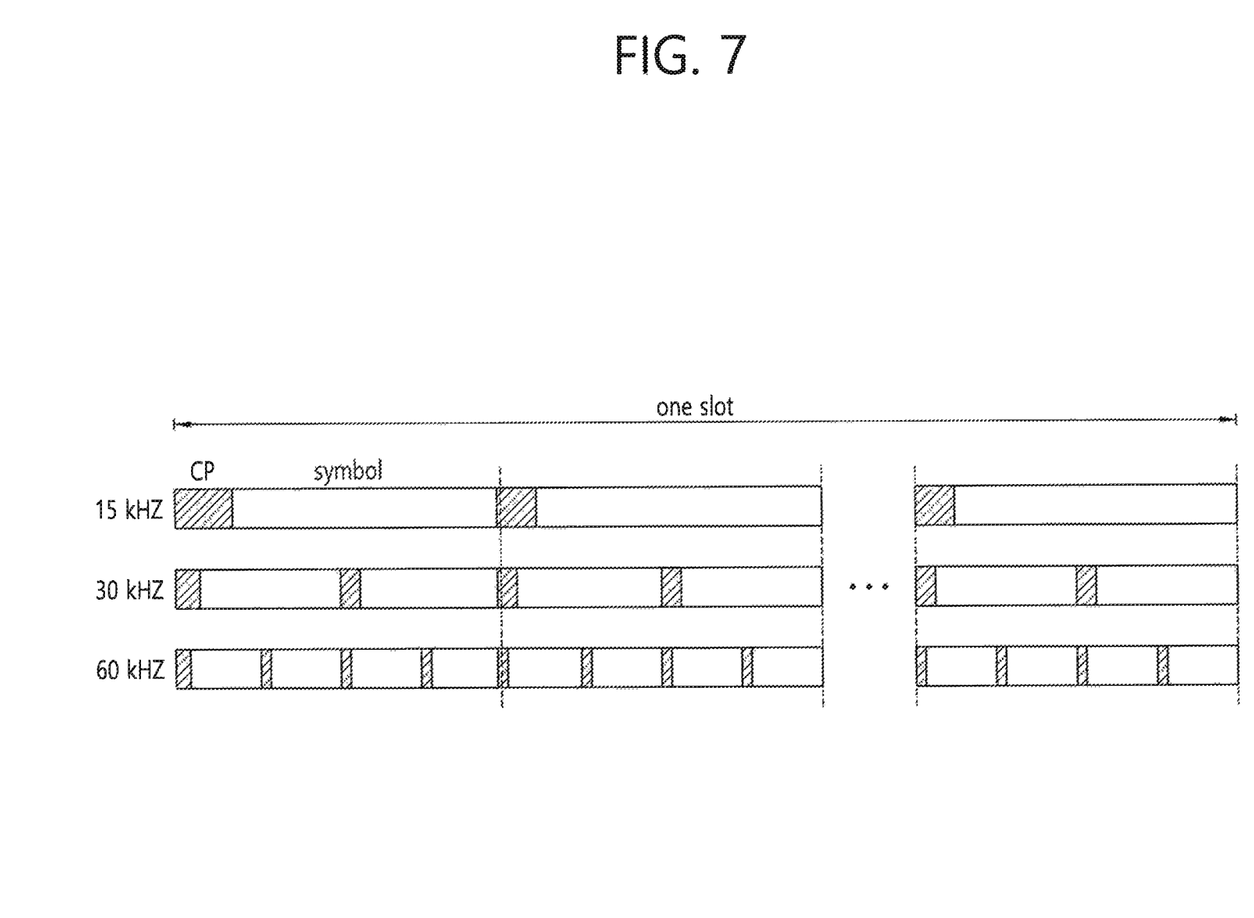
FIG. 7 shows an example of slot/subframe level alignment between different numerologies.

FIG. 7 shows an example of slot/subframe level alignment between different numerologies. Referring to FIG. 7, different numerologies are aligned at slot/subframe level, instead of symbol level alignment.

In NR, it is necessary to consider energy saving, particularly when control channel and data channel are scheduled in time division multiplexing (TDM) manner or frequency division multiplexing (FDM) manner. Particularly, for energy saving, the following should be considered.

Impact of UE DL reception energy consumption should be studied in consideration of the total power consumption mainly. For example, UE decoding power consumption in the physical layer DL control blind decoding in lack of grant may be studied. For example, UE decoding power consumption in the slot with the data may be studied. For example, UE decoding power consumption in the data reception process may be studied. For example, UE decoding power consumption in the measurement may be studied. For example, UE decoding power consumption in the synchronization signal (SS) block may be studied.

UE power reduction techniques should also be studied.

The present invention mainly focuses power saving aspects, specifically for control channel and data channel monitoring procedures. In receiving data, the general procedure may be as follows.

(1) Control channel monitoring (control channel blind detection): First, channel estimation for control channel is performed, and then control channel blind detection is performed.
(2) Storing data part reception, while performing control channel monitoring
(3) Start data decoding if DL data is scheduled If UL grant is scheduled, UL data transmission preparation may be started.

To minimize the power consumption, overall, at least one the following approaches may be considered.

(1) Autonomous discontinuous reception (DRX) or power saving state may be configured or initiated. Generally, a timer which initiates a power saving state may be used. One example of the power saving state is to reduce the bandwidth that a UE needs to monitor or used for transmission.
(2) Different behavior in DRX/power saving state, compared to active state, may be defined.
(3) Sufficient gap between control channel region and data channel region may be allowed, so that control channel decoding can be completed before start of data reception. By this way, a UE may not be required to store or monitor data reception while processing control channels. The UE can read data only if there is actual transmission. Accordingly, power saving on buffering can be achieved.
(4) Control channel region and/or data channel region may be minimized in order to minimize processing of control channel and/or data channel. Particularly, the bandwidth used for DRX/power saving state and the bandwidth used for the active state may be different from each other. Default bandwidth (which is very small, e.g. UE minimum bandwidth) may be used for DRX/power saving state.
(5) Whether there is any scheduled data or not may be indicated in order to minimize waste.

To enable power saving state in which a UE behaves differently from active state, the present invention proposes one of the following approaches.

(1) UE autonomous switch to power saving state based on history: For example, if a UE is configured with DRX, the UE may automatically switches to power saving state or efficient control channel monitoring state. For another example, if a UE detects that the UE has monitored control channel region where no data has been scheduled at least K times or during a certain time duration, the UE may automatically trigger power saving state. K may be reset whenever a UE has received control channel with data or UL grant. Meanwhile, the UE may miss control channel, and accordingly, the duration to detect K data-less control channel may be different from UE and network perspective. In other words, ambiguity may occur in terms of UE behavior if any behavior change occurs based on UE detection on control channels.

(2) The network configures the power saving state or efficient control channel monitoring state to each UE. For example, a timer may be configured, and a UE may go back to the power saving state whenever the timer expires. Reconfiguring the UE to the active state or larger bandwidth than the default bandwidth used for the power saving state may be explicitly indicated. The timer may be reset whenever a UE is reconfigured to the new bandwidth (called as bandwidth part (BWP)) or if there is any scheduling to the UE. Alternatively, the timer may run regardless of scheduling or BWP reconfiguration activity.

More generally, a UE may have a timer indicating during which the power saving state is activated, similar to DRX timer. Timer/period/duration of the power saving state may be configured by the network. Further, a power saving mode active state ("PSM_active") may occur to check whether a UE needs to turn back to the active state. Specifically, the following states may be defined for the present invention.

(1) Power saving state: In the power saving state, a UE radio frequency (RF) bandwidth may be restricted to M MHz. The frequency location (e.g. center/bandwidth) of the M MHz bandwidth may be predefined or configured by higher layer. Further details are described in below. The M MHz may be called a default UE subband or default UE RF bandwidth or default PSM bandwidth or default BWP. Unless the UE changes to the active state, the UE monitoring bandwidth may be restricted to the M MHz. Alternatively, the UE may move out of the power saving state based on the timer only. Alternatively, the UE may move out of the power saving state switch to the bandwidth that the UE monitors/uses for transmission via explicit switching mechanism/indication. For example, scheduling DCI may indicate different DWP to be active from default BWP.

(2) Active state: In the active state, a UE RF bandwidth (i.e. BWP) may be configured to either the maximum UE RF bandwidth or M1 (M1>M) MHz by higher layer. One or more of BWP may be configured. One or more configured BWPs may be activated, and generally, BWPs activated during the active state may have larger bandwidth than default BWP. Control channel and data channel may be scheduled within the configured bandwidth. Unless configured otherwise, in active state, the UE monitoring bandwidth is the configured. UE RF bandwidth.

(3) PSM active state: In the PSM active state, a UE may monitor control/data channel with the bandwidth configured for the active state. During the PSM active state, if a UE detects data scheduling or control which spans beyond M MHz, the UE may switch back to the active state. Otherwise, the UE may remain in the power saving state. The duration of PSM active state may also be configured by higher layer. The PSM active state may be triggered by a time. Or, the PSM active state may bet trigged by the network via dynamic or semi-static signaling or media access control (MAC) control element (CE) signaling.

A UE may be configured with different set of numerologies used in the power saving state and active state. Further, a UE may be configured with different control resource sets used in the power saving state and active state. Alternatively, a UE may be configured with multiple control resource sets, and some resource set(s) among the multiple control resource sets may be deactivated in the power saving state. In other words, the monitoring resource set for control channel may be different in the power saving state and active state, either by implicit or explicit configuration. If implicit configuration is used, a UE may monitor search space candidates fallen into the minimum or default bandwidth configured for the power saving state (i.e. resource region or bandwidth used in the power saving state).

Figure 8:
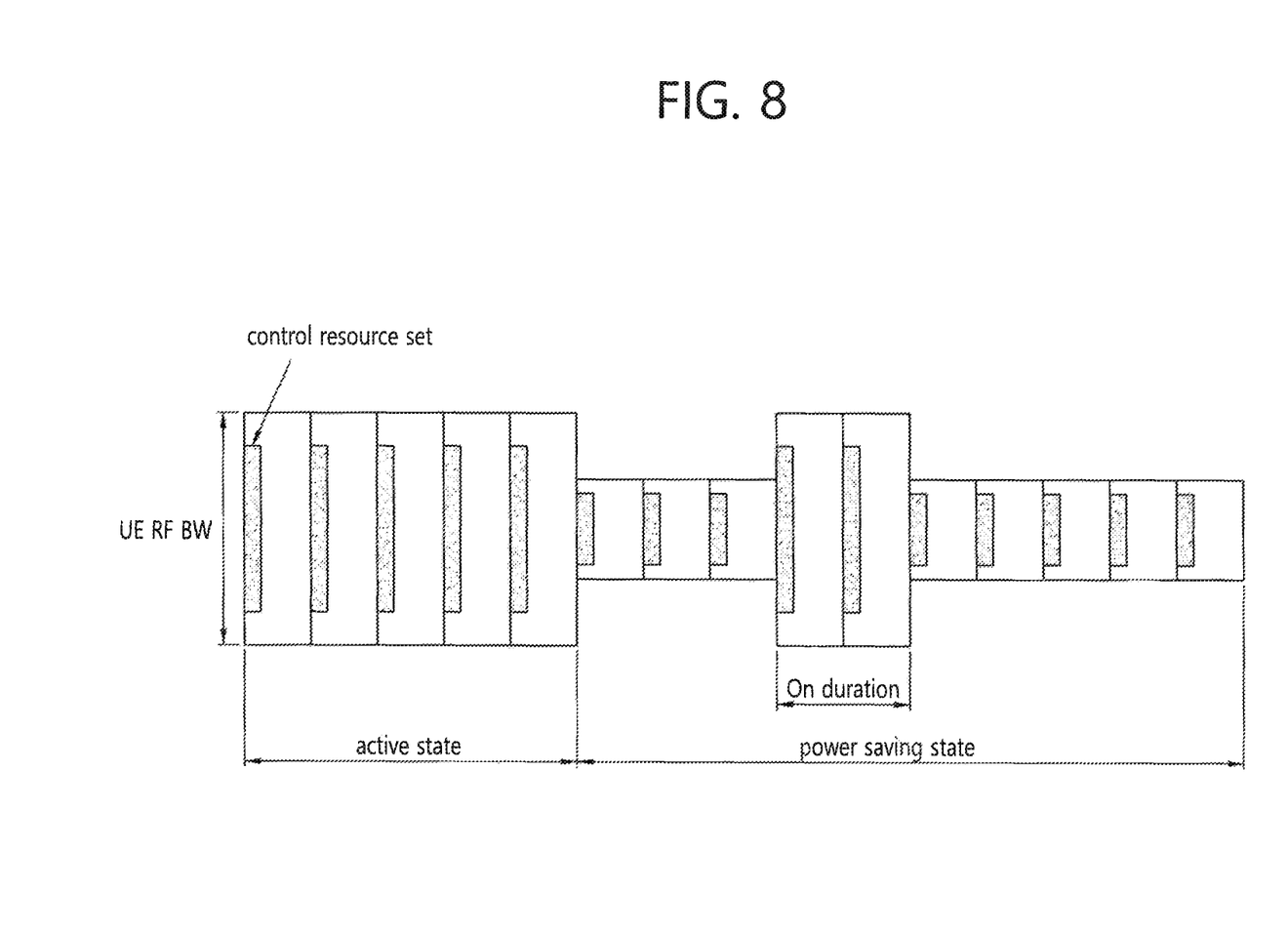
FIG. 8 shows an example of a power saving state according to an embodiment of the present invention.

FIG. 8 shows an example of a power saving state according to an embodiment of the present invention. Referring to FIG. 8, the power saving state is operated as similar as the DRX operation. In the active state, the UE monitors the UE RF bandwidth, which may be the maximum UE RF bandwidth or the configured UE RF bandwidth. Upon transiting to the power saving state, the UE RF bandwidth is adapted to the narrower UE RF bandwidth compared to the UE RF bandwidth in the active state.

In the power saving state or efficient control channel monitoring state, the UE may take different approach in control/data channel monitoring as follows.

(1) Approach 1: Bandwidth usable for control and/or data channel may be restricted to, e.g. minimum system bandwidth or default PSM bandwidth (configured by the higher layer). With this approach, the buffering requirement on control and/or data channel can be minimized. The location of the restricted bandwidth may be configured by the higher layer or indicated dynamically by common signal or group-specific signal/channel or in previous slot/subframe. Default PSM bandwidth may be initial system subband or initial BWP in which a UE performs initial access, e.g. RACH procedure. With this approach, a UE can easily acquire radio resource management (RRM) measurement, synchronization signals, and common control/data as in initial access procedure. Unless otherwise noted/configured, a UE may switch or assume the default PSM bandwidth as the initial system subband. If the common signal or group-specific signal/channel is used, this signal/channel may be transmitted before actual transmission in order to minimize the overhead. In other words, the restricted bandwidth becomes effective at least at the next slot/subframe/TTI transmission.

(2) Approach 2: Cross-subframe/slot/TTI scheduling, or gap between control channel and data channel As another approach, cross-subframe/slot/TTI scheduling may be supported in order to allow sufficient time between control channel monitoring and data channel monitoring. If control channel is transmitted over the entire subframe/slot/TTI, cross-subframe/slot/TTI may have a gap between control subframe/slot/TTI and data subframe/slot/TTI. The gap may be configured by the network or fixed. The UE may report its capability on the required gap.

Similarly, the gap may be configured or fixed gap may be assumed between control channel and data channel. For example, between control channel and data channel, gap of K OFDM symbols may be configured (e.g. K=3). The UE may be configured whether a UE may use the gap in the power saving state or not by higher layer signaling. For the gap, at least one of the following options may be considered.

To enhance or allow efficient multiplexing, K may be defined as one of mini-slot size.

Alternatively, for UE power saving, the UE may be allowed to puncture or not to receive first few OFDM symbols, if a UE suspects that there could be no data associated with the control channel or a TIE is in the power saving state. This behavior may be triggered if a UE detects "no data scheduling" for more than K1 slot/TTI/subframe. Alternatively, this behavior may also be configured by the higher layer. Also, the timer to determine K or K1 may be configured.

Cross-mini-slot/sTTI scheduling may be performed with multiple mini-slot/sTTI scheduling. In this case, necessary gap may be configured for one or multiple of mini-sot/sTTIs.

IF the gap is used, the gap should be aligned between the network and the UE. For achieving the alignment, OFDM symbol in which a demodulation reference signal (DM-RS) or any data demodulation RS (base RS) is transmitted may be fixed or assumed as same. For example, instead that DM-RS is transmitted in the first OFDM symbol of data transmission, DM-RS may be transmitted in the OFDM symbol of data transmission with consideration of gap between control channel and data channel. If DM-RS pattern is defined so that it starts from the first OFDM symbol of data transmission or it starts from a fixed DM-RS position which may potentially be punctured by the UE for creating gap between control channel and data channel for power saving purpose, the network may transmit additional DM-RS in the OFDM symbol which is not punctured by the UE. Alternatively, DM-RS pattern for DL data may be fixed to an OFDM symbol which cannot be punctured to create the gap. Generally, this concept may be expanded to a case where OFDM symbol carrying base DM-RS is somehow omitted from transmission or punctured. In this case, the network may transmit base DM-RS in the additional position. In this case, the presence of additional base DM-RS may be indicated dynamically and/or semi-statically. The gap may be configured or indicated dynamically by downlink control information (DCI).

The present invention also proposes that any power saving technique(s) is restricted only to the power saving state or efficient control channel monitoring state or activated, only when a UE is explicitly indicated with the behavior either by higher layer signaling or dynamic signaling. Also, a UE may implicitly activate the behavior if UE autonomous decision is allowed.

A UE may miss detection of control channel, which may lead ambiguity between the UE and network. The network should allow possibility of control channel mis-detection, in terms of scheduling or determine any UE behavior. To reduce possible mis-detection, K may be configured as a range, e.g. [100-120], and a UE may initiate power saving state if reception of data-less control channel exceeds the range of values. Alternatively, if any ambiguity becomes an issue, a UE may send a feedback to the network whenever any behavior or mode change occurs. For example, an indication of mode change may be transmitted via physical random access channel (PRACH), scheduling request (SR), data channel or control channel.

Alternatively, the presence of data scheduling, or intention of data scheduling may be indicated dynamically indicate. For example, the bandwidth of the control resource set may be fixed regardless of UE RF bandwidth. Once a UE is scheduled with data which spans beyond the bandwidth of the control resource set, the UE may increase its RF bandwidth. When the UE RF bandwidth is increased, it is expected that a UE may not reduce its RF bandwidth in the next slot for control channel monitoring. The UE may maintain larger bandwidth (than the bandwidth of the control resource set) over T slots/subframes. T may be configured by higher layer. If a UE receives data which spans beyond the bandwidth of the control resource set or minimum system bandwidth (or default PSM bandwidth), the UE may reset the timer. If a UE has not received which spans beyond the bandwidth of the control resource set or minimum system bandwidth (or default PSM bandwidth), the UE may reduce its bandwidth to default PSM bandwidth.

Alternatively, the latency of control channel monitoring may be reduced, in order to quickly finish UE power on if data is not scheduled. If a UE needs to monitor search space candidates from 0 to M, a UE may assume that DL scheduling DCI is scheduled only between 0 to M/2, for example. By restricting search space candidates, the overall latency to finish control channel decoding can be minimized.

Alternatively, different or double or increase subcarrier spacing for control channel transmission may be taken, and control transmission may occur over the same OFDM symbol counts or the same duration to the original duration, and then remained portion may be used for control channel decoding time. For example, if subcarrier spacing is 15 kHz, 30 or 60 kHz of subcarrier spacing may be used for the control channel transmission. And if the control is transmitted over 2 OFDM symbols, it may still be transmitted over 2 OFDM symbols of 15 kHz, 30 kHz and 60 kHz subcarrier spacing. For the increased subcarrier spacing, bandwidth may be increased as well so that the required number of symbols can be kept as the same. The remained symbols (e.g. 2 for 30 kHz subcarrier spacing, 6 for 60 kHz subcarrier spacing) may be used for the gap for control channel decoding before data transmission.

Alternatively, for a UE, periodic or aperiodic cell common or group-common or UE-specific broadcast channel/signal indication which indicates whether the UE will be scheduled with data or not may be used. If a UE is indicated that there will be no data scheduled, the UE may only monitor control channel, or may take the behavior as mentioned above for the power saving state. The search space to carry the signal may be restricted for fast decoding latency. This indication may also include whether a UE is scheduled with cross-subframe/slot/TTI scheduling or same-subframe/slot/TTI scheduling.

Hereinafter, various aspects regarding the power saving state according to the present invention are described.

1. Measurement

When a UE is in the power saving state or is configured to monitor reduced bandwidth than UE RF bandwidth, it is necessary to handle RRM accordingly.

Generally, a UE may be allowed to increase RF bandwidth per configured RRM bandwidth (i.e. same RRM as in the active state). Or, a UE may be allowed to stay at the reduced RF bandwidth for the power saving state, which may lead different RRM measurement in the power saving state and active state. Or, in the power saving state, the frequency region in which RRM RS is transmitted may be different.

In this sense, a UE may be required to perform measurement based on measurement gap for RF retuning. This is particularly necessary when frequency region of the power saving state is not within UE RF bandwidth if UE tunes to different frequency or changes its RF bandwidth for RRM measurement. For example, it is assumed that the UE supports 100 MHz, system bandwidth is 500 MHz, RRM RS is transmitted in the center 100 MHz, and PSM default bandwidth is 20 MHz configured in edge of the system bandwidth. In this case, for RRM measurement, a UE needs measurement gap. Alternatively, to minimize the necessity of measurement gap, the default PSM bandwidth may always be aligned with configured RRM bandwidth for the UE in terms of center frequency and bandwidth. When a UE is configured with carrier aggregation and different numerology is used among different carriers in which the same measurement gap is applied, it is necessary to define the default numerology where measurement gap is applied. For example, measurement gap may be configured in absolute time (e.g. 6 ms) or based on subframe or based on the primary cell (PCell) numerology (e.g. 6 slots) or the smallest subcarrier spacing used in frequency bands where measurement may occur or higher layer configured with slots and the numerology.

In terms of RRM measurement, if RRM behavior is different between the power saving state and active state or between different UTE RF bandwidths, different RRM measurement resources in terms of time/frequency resource may be configured. For example, different RRM bandwidth and time location in which measurement may occur may be configured differently between the power saving state and active state.

Also, if a UE performs measurement on the default PSM bandwidth, it is necessary to consider neighbor cell measurement as well. Thus, a UE may expect synchronization signals from serving cell and neighbor cell on the configured measurement bandwidth. To avoid confusion between main synchronization signals on the anchor subband from additional synchronization signals, different root sequence, location and/or other information may be used. A UE may perform different cell search in case of measurement in different bandwidth.

2. Radio link failure (RLF)

A UE is expected to perform RLF monitoring in both the power saving state and active state. For RLF measurement, to avoid unnecessarily RLF trigger condition, a UE behavior may be as follows (but not limited thereto).

A UE may perform measurement on UE RF bandwidth for the active state. Time/frequency location in which RLF is measured may also be configured.

A UE may perform measurement on the default PSM bandwidth if a UE is in the power saving state. Otherwise, the UE may perform measurement on the UE RE bandwidth or bandwidth configured in the active state. Average may be taken between two measurements if necessary. Or, separate reporting may also be considered.

A UE may perform RLF only in the active state.

A UE may perform RLF separately on the power saving state and active state.

A UE may perform RLF on the current state only. If the current state is the power saving state, and RLF is triggered, the UE may trigger RLF reporting to the network, and the network may trigger active state for further RLF measurement. If RLF is triggered for the active state as well, the network may hand-over the UE.

3. Retuning/RF adjustment latency:

When a UE switches UE RE bandwidth, the latency may be needed for bandwidth adaptation. At least when dynamic bandwidth adaptation is used, the maximum latency needs to be assumed regardless of actual necessary adjustment latency. The maximum latency may be configured by higher layer, and possibly, the required latency may be signaled by the UE to the network.

4. Resource block group (RBG) or bandwidth configuration

When different bandwidth is configured, in order to align and support efficient multiplexing of data between different UE bandwidths for different UEs, it may be necessary to align RBGs among different UE RF bandwidths. One approach is to assume that RBG is constructed based on only system bandwidth and each adapted UE RF bandwidth may follow RBG constructed based on system bandwidth. If different RBGs are used based on UE RE bandwidth, it may be necessary to restrict UE RF bandwidth as a multiple of RBGs based on system bandwidth. To allow efficient multiplexing, in terms of distributed mapping, distributed mapping may be restricted to the configured UE RE bandwidth or minimum system bandwidth (e.g. for common data scheduling). Alternatively, bandwidth in which distributed mapping is applied may also be configured by higher layer. For common data scheduling, it may be necessary that the minimum bandwidth or default PSM bandwidth may be configured larger than the initial or minimum system bandwidth in which common data is scheduled. Or, some configured common control/data scheduling timing may also be used, and a UE may increase its RF bandwidth to receive common control/data.

5. Handling UL RF bandwidth

When dynamic bandwidth adaptation is used, similar mechanism used in DL may also be used in UL. However, the gap for bandwidth adaptation may be necessary between DL to UL switching gap and UL portion. It may also need to be clarified whether physical uplink shared channel (PUSCH) and physical uplink control channel (PUCCH) or PUSCH and uplink control information (UCI) transmission can be done in different bandwidth, which may require bandwidth adaptation with frequency retuning. If this is supported, necessary gap between PUSCH and PUCCH may also be necessary. In case of TDD, it is generally desirable to keep the same center between DL and UL, thus, bandwidth adaptation between DL and UL may be done with keeping the same center frequency. If power saving state is configured, the same bandwidth may be used between DL and UL unless it is separately/independently configured. The resource location of UCI may also be different depending on the configured UL bandwidth for UCI transmission or UL transmission in general. For example, if PUCCH resource is configured at the edge of system bandwidth or configured UE bandwidth, the same or separate offset to indicate PUCCH resource from the edge of system bandwidth or configured UE bandwidth may be configured. In other words, base resource for PUCCH or UCI transmission may be different between different UE RF bandwidths. At least in case of paired spectrum, different bandwidth may be used between DL and UL. For example, in UL heavy case, UL bandwidth may be configured as larger compared to DL bandwidth. In other words, the power saving state may be configured per DL and UL, independently.

6. Time/frequency tracking

It is expected that tracking RS may be transmitted periodically within a certain system bandwidth. When LIE bandwidth is adapted, the following options may be considered.

UE bandwidth may be larger than tracking RS bandwidth so that tracking performance can be maintained.

The UE may change bandwidth to perform tracking if bandwidth is smaller than the required tracking RS bandwidth More dense or additional or separate tracking RS may be transmitted within the adapted UE bandwidth to overcome the performance.

If there is no performance issue, a UE may perform tracking only in the configured BWP (or active BWP).

Figure 9:
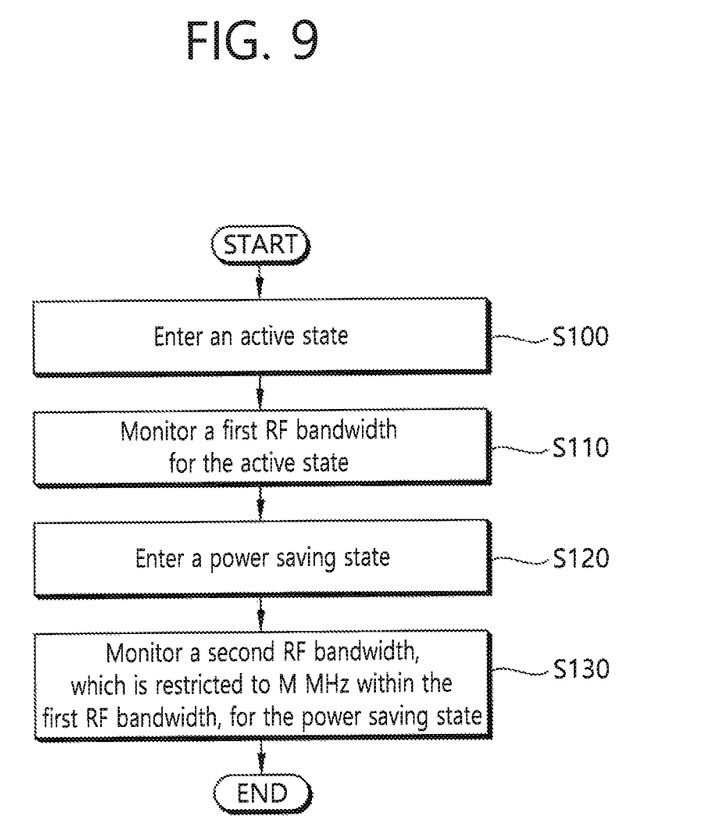
FIG. 9 shows a method for operating in a power saving state by a UE according to an embodiment of the present invention.

FIG. 9 shows a method for operating in a power saving state by a UE according to an embodiment of the present invention. The present invention described above may be applied to this embodiment.

In step S100, the UE enters an active state. In step S110, the UE monitors a first RF bandwidth for the active state.

In step S120, the UE enters the power saving state. In step S130, the UE monitors a second RF bandwidth, which is restricted to M MHz within the first RF bandwidth, for the power saving state.

The first RF bandwidth may correspond to a maximum UE RF bandwidth, or correspond to M1 MHz, which is configured by a network and broader than the second RF bandwidth. The second RF bandwidth may correspond to a default minimum bandwidth configured by a network, or correspond an initial system subband. A frequency location of the second RF bandwidth may be configured by a network.

A timer during which the power saving state is activated may be configured by the network. Or, the UE may enter the power saving state autonomously if the LTE is configured with DRX. Or, the UE enters the power saving state autonomously if the UE detects that the UE has monitored a control channel where no data has been scheduled at least K times.

Different sets of numerologies may be used for the active state and the power saving state, respectively. Different sets of control channel resource may be used for the active state and the power saving state, respectively. A bandwidth of a control resource set may be fixed regardless of UE RF bandwidth.

A RRM measurement may be performed on the first RF bandwidth, while the UE is in the power saving state. A RBG may be configured based on a system bandwidth, and the first RF bandwidth and the second. RF bandwidth may follow the RBG. The second RF bandwidth may be used both for DL and UL, respectively. A resource location of a PUCCH may be configured depending on the second RF bandwidth for PUCCH transmission.

Figure 10:
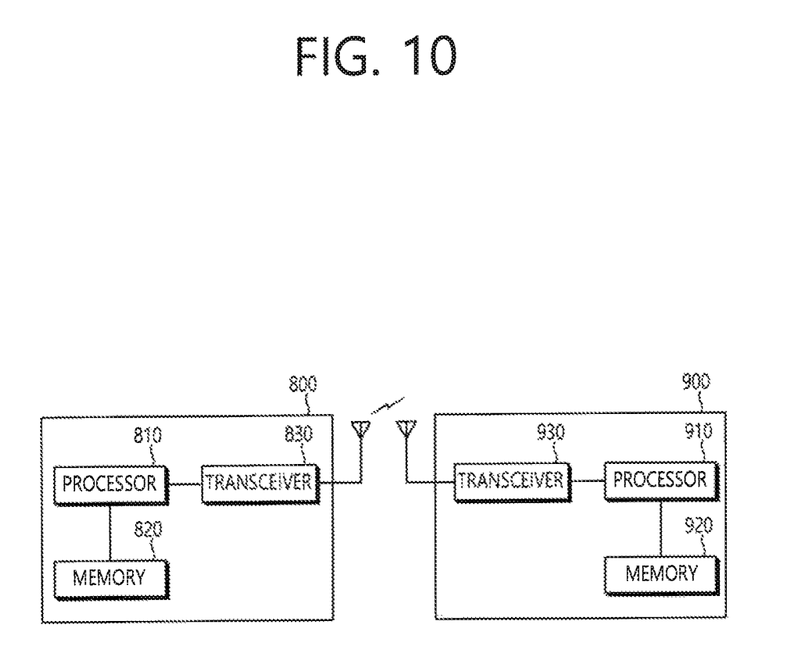
FIG. 10 shows a wireless communication system to implement an embodiment of the present invention.

FIG. 10 shows a wireless communication system to implement an embodiment of the present invention.

A network node 800 includes a processor 810, a memory 820 and a transceiver 830.

The processor 810 may be configured to implement proposed functions, procedures and/or methods described in this description. Layers of the radio interface protocol may be implemented in the processor 810. The memory 820 is operatively coupled with the processor 810 and stores a variety of information to operate the processor 810. The transceiver 830 is operatively coupled with the processor 810, and transmits and/or receives a radio signal.

A UE 900 includes a processor 910, a memory 920 and a transceiver 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The transceiver 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The transceivers 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope of the present disclosure.

What is claimed is:

1. A method performed by a wireless device configured to operate in a wireless communication system, the method comprising:
    configuring a first radio frequency (RF) bandwidth as a monitoring bandwidth;
    monitoring a first control channel on the first RF bandwidth;
    receiving the first control channel on the first RF bandwidth;
    resetting a condition related to switching of the monitoring bandwidth upon reception of the first control channel on the first RF bandwidth;
    monitoring a second control channel on the first RF bandwidth;
    detecting that the second control channel is not received on the first RF bandwidth within the condition;
    switching the monitoring bandwidth from the first RF bandwidth to a second RF bandwidth based on detecting that the second control channel is not received on the first RF bandwidth within the condition; and
    monitoring a third control channel on the second RF bandwidth,
    wherein the second RF bandwidth is a default subband.

2. The method of claim 1, wherein the first RF bandwidth is configured by a network.

3. The method of claim 2, wherein the first RF bandwidth is a maximum UE RF bandwidth.

4. The method of claim 1, wherein the second RF bandwidth is configured by a network.

5. The method of claim 1, wherein a frequency location of the second RF bandwidth is configured by a network.

6. The method of claim 1, wherein a bandwidth of a control resource set is fixed regardless of user equipment (UE) RF bandwidth.

7. The method of claim 1, wherein a radio resource management (RRM) measurement is performed on the first RF bandwidth.

8. The method of claim 1, wherein a resource block group (RBG) is configured based on a system bandwidth or common PRBs among wireless devices, and
    wherein the first RF bandwidth and the second RF bandwidth follows the RBG.

9. The method of claim 1, wherein the second RF bandwidth is used both for downlink (DL) and uplink (UL), respectively.

10. The method of claim 1, wherein a resource location of a physical uplink control channel (PUCCH) is configured depending on the second RF bandwidth for PUCCH transmission.

11. The method of claim 1, wherein the first RF bandwidth is broader than the second RF bandwidth.

12. The method of claim 1, wherein the second RF bandwidth is an initial system subband.

13. A wireless device configured to operate in a wireless communication system, the wireless device comprising:
- at least one transceiver;
- at least one processor; and
- at least one computer memory operably connectable to the at least one processor and storing instructions that, based on being executed by the at least one processor, perform operations comprising:
  - configuring a first radio frequency (RF) bandwidth as a monitoring bandwidth;
  - monitoring a first control channel on the first RF bandwidth;
  - receiving the first control channel on the first RF bandwidth;
  - resetting a condition related to switching of the monitoring bandwidth upon reception of the first control channel on the first RF bandwidth;
  - monitoring a second control channel on the first RF bandwidth;
  - detecting that the second control channel is not received on the first RF bandwidth within the condition;
  - switching the monitoring bandwidth from the first RF bandwidth to a second RF bandwidth based on detecting that the second control channel is not received on the first RF bandwidth within the condition; and
  - monitoring a third control channel on the second RF bandwidth,
  - wherein the second RF bandwidth is a default subband.

14. A processor for a wireless device configured to operate in a wireless communication system, wherein the processor is configured to control the wireless device to perform operations comprising:
- configuring a first radio frequency (RF) bandwidth as a monitoring bandwidth;
- monitoring a first control channel on the first RF bandwidth;
- receiving the first control channel on the first RF bandwidth;
- resetting a condition related to switching of the monitoring bandwidth upon reception of the first control channel on the first RF bandwidth;
- monitoring a second control channel on the first RF bandwidth;
- detecting that the second control channel is not received on the first RF bandwidth within the condition;
- switching the monitoring bandwidth from the first RF bandwidth to a second RF bandwidth based on detecting that the second control channel is not received on the first RF bandwidth within the condition; and
- monitoring a third control channel on the second RF bandwidth,
- wherein the second RF bandwidth is a default subband.

* * * * *